(12) United States Patent
Bell

(10) Patent No.: US 7,368,147 B2
(45) Date of Patent: May 6, 2008

(54) DRESSING FOR AUTOMOBILE TIRES, TRIM, AND BUMPERS

(75) Inventor: Otis Franklin Bell, San Juan Capistrano, CA (US)

(73) Assignee: BAF Industries, Tustin, CA (US)

( * ) Notice: Subject to any disclaimer, the term of this patent is extended or adjusted under 35 U.S.C. 154(b) by 179 days.

(21) Appl. No.: 10/935,921

(22) Filed: Sep. 8, 2004

(65) Prior Publication Data

US 2006/0052536 A1 Mar. 9, 2006

(51) Int. Cl.
*B05D 5/00* (2006.01)

(52) U.S. Cl. .................. 427/140; 510/244; 510/403; 524/500; 524/502; 524/506; 525/100

(58) Field of Classification Search ............ None
See application file for complete search history.

(56) References Cited

U.S. PATENT DOCUMENTS

| | | | |
|---|---|---|---|
| 3,956,174 A | 5/1976 | Palcher | |
| 4,133,921 A | 1/1979 | Palcher | |
| 4,265,663 A | 5/1981 | Gilicinski et al. | |
| 5,378,271 A | 1/1995 | Arimoto et al. | |
| 5,432,217 A | 7/1995 | O'Lenick | |
| 5,433,890 A * | 7/1995 | Meyer et al. | 427/355 |
| 5,693,704 A * | 12/1997 | Estes | 524/506 |
| 5,977,239 A | 11/1999 | Chauffour et al. | |
| 6,013,323 A * | 1/2000 | Klayder et al. | 427/384 |
| 6,660,335 B2 | 12/2003 | Mattia et al. | |
| 6,933,268 B2 * | 8/2005 | White | 510/405 |

OTHER PUBLICATIONS

Chemical description of DC 536 fluid obtained from the Dow Corning web site.*

* cited by examiner

*Primary Examiner*—Marc S. Zimmer
(74) *Attorney, Agent, or Firm*—Walter A. Hackler

(57) ABSTRACT

The present invention provides an improved aqueous composition comprising a dimethylpolysiloxane for preserving and renewing the surfaces of automobile tires, bumpers, and trim results from combining a dimethylpolysiloxane with an acrylic polymer, having carboxylic acid groups in an aqueous liquid wherein said acrylic acid polymer is an amount effect to provide a gelled composition.

6 Claims, No Drawings

DRESSING FOR AUTOMOBILE TIRES, TRIM, AND BUMPERS

The present invention relates to a tire polishing and protective composition for the tires of cars, bicycles, etc. These compositions are also useful for preserving automobile bumpers and trim. These compositions not only protect tires, and import gloss, even to old tires, but also import water repellency to tires.

Prior art materials for the preservation of rubber were based on lamp black and included materials highly corrosive to metal and painted surfaces commonly found on automobiles. These rubber treatment materials were applied like paint to the rubber surfaces. The rubber treated in this manner had an unnatural "painted" appearance. Re-application required removal of old coatings and was difficult and inefficient. Not only were such materials ineffective in protecting rubber surfaces from deterioration caused by environmental stresses, but they were also quite messy and difficult to use. In addition, the corrosive and toxic ingredients were harmful to the adjacent surfaces and to the user.

It is known that dimethylpolysiloxane polymers can be applied to the surface of rubber to give a surface protecting and sealing film. One such method of application is direct application of the dimethylpolysiloxane to the rubber surface. While resulting in some surface protection the method of application is cost ineffective and results in a nonuniform greasy film. Another method is to dissolve the dimethylpolysiloxane in a solvent like mineral spirits and apply the solution to the tire. In addition to the environmental liabilities of using a polluting flammable solvent, the solvent often has a deleterious effect upon rubber. The last and most accepted application method for preparing dimethylpolysiloxane compositions for surface coating of rubber articles is the preparation of an aqueous emulsion using a surface active agent and high pressure mixing process like homogenization to get a milky white liquid.

There have been several practical limitations on the use of such an aqueous emulsion product, i.e. the inability to lay down a uniform film without several applications, and the sealing of the surface of the rubber. Several inventors have addressed these problems. Most notably, U.S. Pat. No. 3,956,174, to Palcher, discloses that a dimethylpolysiloxane emulsion can be improved by addition of from about 15% to about 65% by weight of one or more polyol compounds, preferably diethylene glycol and glycerin. The patent teaches that the rubber preservative emulsion disclosed is compounded of nontoxic materials which are safe for the user as well as for surfaces adjacent to rubber parts on automobiles. The Palcher invention attempts to seal up the tire pores by inclusion of these polyols. This may be cosmetically appealing, but it is not the preferred way to treat the surface of the tire. Rubber tires are porous materials through which pass small amounts of water, environmental gases, ozone, and other materials. The degradation of the rubber which starts on the surface, also occurs within the porous rubber polymer matrix. While sealing up the porous structures with the Palcher compositions, minimizes surface degradation, little protection is given to the internal rubber polymer structure.

U.S. Pat. No. 5,183,845, to Parkinson, et al., teaches that the "emulsions of the present invention are applied to the polymer surfaces and by virtue of the composition, once applied, the emulsion will break causing the deposition of a uniform coating of treatment chemical. The treatment chemical is formulated to protect, renew, and preserve the polymer surface being treated."

The use of these dimethylpolysiloxane emulsions require spraying equipment to apply to automobile tires, etc. Also, since such emulsions are relatively low in viscosity they tend to run off the tires and leave a milky residue. Also, portions of said low viscosity liquid emulsions are wasted from spilling or transferring from storage tub to applicator.

SUMMARY OF THE INVENTION

The present invention provides a process for preserving and renewing the surface of automobile tires, trim and bumpers which comprises wetting the surface of said tires, trim, or bumpers with a gel composition comprising a water-soluble dimethylpolysiloxane polymer and an acrylic polymer dispersed in water. The gel composition utilized in the process of the present invention provides a high gloss, exterior gel dressing for use on automobile tires, trim, and bumpers.

DETAILED DESCRIPTION OF THE INVENTION

It has been found that an improved aqueous composition comprising a dimethylpolysiloxane for preserving and renewing the surfaces of automobile tires, bumpers, and trim results from combining a dimethylpolysiloxane with an acrylic polymer, having carboxylic acid groups, in an aqueous liquid wherein said acrylic acid polymer is an amount effect to provide a gelled composition.

For the purpose of this invention, a gel is a colloidal emulsion in which the dispersed phase, i.e. dimethylpolysiloxane, combines with the dispersion phase, i.e. water, to produce a semi-solid material. More preferably, the gel is a thixotropic gel, i.e. the viscosity of the gel breaks down under shear and allows flow so that the gel composition of this invention may be applied like a liquid to cover the surface of the automobile tire, trim, or bumper. Upon cessation of the shear, i.e. after application of the gel to the respective surface, the viscosity of the composition reverts to the gel state so that running, dripping, etc. is prevented and the gel composition may be allowed to dry in place. For the purposes of this invention the compositions are defined as thixotropic fluids, i.e. a thixotropic fluid is a liquid that tends to turn into a gel when left standing but turns back into a liquid if agitated, as by vibrations or subjection to adequate shear.

The composition comprises:
a dimethylpolysiloxane preferably conforming to the following structure,

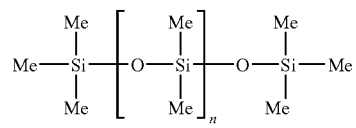

wherein:
Me is methyl;
n is an integer ranging from 40 to 1600.

The dimethylpolysiloxane is dispersed in an aqueous solution comprising an acrylic polymer that functions as a thickening agent to form a thixotropic gel of the dimethylpolysiloxane dispersed in water.

The viscosity of the gel is sufficient to provide a thixotropic fluid that can be applied to the surface of an automobile tire, trim, or bumper under shear, whereby the gel flows and covers said surface and upon cessation of the shear force the gel reverts to a semi-solid and remains in place without dripping or running from said surface.

The dimethylpolysiloxane concentration of the gel compositions of this invention may vary from 5 to 50 percent, by weight, more preferably from 15 to 40 percent, by weight, e.g. about 35 percent, by weight.

Suitable dimethylpolysiloxane products are well known in the art and may be selected based on the above structure and their ability to preserve and renew automobile tires, trim, and bumpers and to provide a high gloss finish.

The acrylic polymer included in the compositions of this invention comprise polymers resulting from the polymerization of acrylic acid and/or methacrylic acid monomers, alone, or preferably with other comonomers. It is preferred that the acrylic or methacrylic acid-containing copolymer will contain sufficient acrylic or methacrylic acid to be at least partially solubilized by alkali in an aqueous solution. To achieve these objectives an acrylic acid or methacrylic acid monomer may be copolymerized with other acrylate monomers, e.g. ethylacrylate, butylacrylate, octylacrylate and the like. An example of suitable copolymer includes a copolymer of methacrylic acid and ethylacrylate.

The concentration of the acrylic polymer in the compositions utilized in this invention is adjusted to provide a thixotropic gel upon mixing with the dimethylpolysiloxane. The acrylic polymer is also selected to have a sufficient molecular weight to provide the necessary thixotropy to the resulting gel compositions. The acrylic polymers will also include sufficient methacrylic acid and/or acrylic acid comonomer to provide the necessary thixotropy when the dimethylpolysiloxane emulsions of this invention are adjusted to the desired pH, i.e. from about 6.5 to 7.5.

The pH may be adjusted with amines or basic, water soluble oxides, hydroxides or carbonates of alkali metals, such as sodium or potassium, or alkaline earth metals such as magnesium. Preferably, the pH of the gel compositions of this invention is adjusted with potassium or sodium hydroxide, e.g., sodium hydroxide.

The gel compositions of this invention may comprise from 0.2 to 10 percent, by weight, acrylic polymer, more preferably from 0.5 to 5 percent, by weight, acrylic polymer, e.g. about 0.6 percent, by weight, acrylic polymer.

Suitable acrylic polymers for use in the preparation of the gel compositions of this invention include Rhom-Haas acrylic emulsions ASE-60 or ASE-100.

The gel compositions of this invention may also include surfactants to stabilize the dispersion of dimethylpolysiloxane in water. For example, nonionic surfactants, such as ethylene oxide adducts of octyl and nonylphenol, and anionic surfactants, such as sulfonates may be used in the gel compositions of this invention.

Sodium xylene sulfonate is especially preferred as a surfactant for stabilizing the compositions of this invention.

The surfactant concentration in the compositions of this invention may vary from 0.1 to 5 percent, by weight, more preferably from 0.5 to 2 percent, by weight, e.g. about 1 percent, by weight.

The gel compositions of this invention may further include preservatives, fragrances, colorants, etc.

A preferred embodiment of the compositions of the present invention is as follows:

| Component | % | Function |
|---|---|---|
| Water | 61.67 | Carrier |
| Acrylic polymer | .6 | Gelling |
| Citric Acid 50% solution | .1 | pH control |
| Dimethyl Polysiloxane | 34.5 | Glossifier |
| Sodium xylene sulfonate | 1 | Stabilizer |
| Triethanolamine 85% Solution | 1.6 | Neutralizer |
| 1-(3-Chloroallyl)-3,5,7-triaza-1-azoniaadamantane chloride | .1 | Preservative |
| Fragrance mixture | .1 | Fragrance |
| Water | .1 | Carrier |
| Pthalocyanine dye | trace | Colorant |
| Sodium Hydroxide 50% Solution | .23 | pH Control |

The composition is prepared as follows:

A mixing tank is charged with water, and then, while mixing the acrylic polymer is added followed by the citric acid solution. The resulting mixture is mixed until completely dispersed.

While continuing to mix, the remaining ingredients are added in the order shown.

The dye is pre-mixed with water before adding to the batch.

As discussed above, the gel compositions of this invention are thixotropic fluids, therefore upon standing the compositions are semi-solid in nature, i.e. they exhibit a room temperature viscosity of 30,000-40,000 centipoise, or greater, using a Brookfield at 20 rpm spindle. However, upon shear, e.g. a shear of blender or pump, the gel compositions revert to a liquid and flow. Thus, when a force is exerted on the gel compositions of this invention equivalent to or greater than the force used to apply such gel compositions to the surface of an automobile tire, bumper, or trim, e.g. by painting or wiping, the viscosity of the gel composition decreases to 500 centipoise or less, and the gel composition flows to cover such surface.

Although there has been hereinabove described a specific dressing for automobile tires, trim, and bumpers in accordance with the present invention for the purpose of illustrating the manner in which the invention may be used to advantage, it should be appreciated that the invention is not limited thereto. That is, the present invention may suitably comprise, consist of, or consist essentially of the recited elements. Further, the invention illustratively disclosed herein suitably may be practiced in the absence of any element which is not specifically disclosed herein. Accordingly, any and all modifications, variations or equivalent arrangements which may occur to those skilled in the art, should be considered to be within the scope of the present invention as defined in the appended claims.

What is claimed is:

1. A process for preserving and renewing the surface of automobile tires, trim, and bumpers comprising wetting said surface with a thixotropic gel emulsion composition comprising 15-40 weight percent, of a water-insoluble dimethylpolysiloxane polymer and 0.5 to 5 weight percent of an acrylic polymer dispersed in water and having a viscosity of 30,000-40,000 centipoise at room temperature shearing said thixotropic gel composition by painting or wiping said surface to cause said thixotropic gel composition to decrease in viscosity to 500 cp or less thereby reverting to a liquid and flowing to wet said surface, ceasing said shearing to allow said liquid to revert to said thixotropic gel composition and allowing said thixotropic gel composition, to dry in place.

2. The process of claim 1 wherein said gel composition has a pH of from about 6.5 to about 7.5.

3. The composition of claim 2 wherein said composition comprises about 0.5 weight percent acrylic polymer.

4. A gel emulsion composition for preserving and renewing the surface of automobile tires, trim, and bumpers having a viscosity of 30,000-40,000 centipoise at room temperature and comprising from 15 to 40 percent by weight of a water-insoluble dimethylpolysiloxane polymer, from 0.5 to 5 percent by weight of an acrylic polymer, and from 0.1 to 5 percent by weight of a surfactant, wherein the composition exhibits thixotropic properties upon use.

5. The gel emulsion composition according to claim 4 wherein the pH of the composition is from about 6.5 to 7.5.

6. The gel emulsion composition according to claim 4 wherein the acrylic polymer component is present in amount of about 0.5 weight percent.

* * * * *